(12) United States Patent
Qin

(10) Patent No.: US 11,796,195 B2
(45) Date of Patent: Oct. 24, 2023

(54) HUMIDIFIER WITH AN ULTRASONIC SUSPENSION ATOMIZING HEAD

(71) Applicant: Yong Qin, Guangdong (CN)

(72) Inventor: Yong Qin, Guangdong (CN)

( * ) Notice: Subject to any disclaimer, the term of this patent is extended or adjusted under 35 U.S.C. 154(b) by 138 days.

(21) Appl. No.: 17/485,512

(22) Filed: Sep. 27, 2021

(65) Prior Publication Data

US 2023/0009492 A1  Jan. 12, 2023

(30) Foreign Application Priority Data

Jul. 12, 2021  (CN) .......................... 202121583421.3

(51) Int. Cl.
| | |
|---|---|
| *F24F 6/14* | (2006.01) |
| *F24F 11/89* | (2018.01) |
| *F24F 13/20* | (2006.01) |
| *F24F 6/00* | (2006.01) |

(52) U.S. Cl.
CPC ................ *F24F 6/14* (2013.01); *F24F 11/89* (2018.01); *F24F 13/20* (2013.01); *F24F 2006/006* (2013.01); *F24F 2006/008* (2013.01); *F24F 2221/26* (2013.01)

(58) Field of Classification Search
CPC ... F24F 6/14; F24F 2006/008; F24F 2006/006
See application file for complete search history.

(56) References Cited

U.S. PATENT DOCUMENTS

| 2012/0234166 A1* | 9/2012 | Markham | ................. F24F 6/18 |
| | | | 95/149 |
| 2020/0096213 A1* | 3/2020 | Liang | ........................ F24F 6/12 |
| 2021/0404676 A1* | 12/2021 | Zhan | ........................ F24F 6/12 |

FOREIGN PATENT DOCUMENTS

CN  202792361 U  *  3/2013

OTHER PUBLICATIONS

CN202792361U Translation (Year: 2013).*

* cited by examiner

*Primary Examiner* — Schyler S Sanks

(57) ABSTRACT

The invention provides a humidifier with an ultrasonic suspension atomizing head, comprising a water tank, an atomization guiding tube, an atomizing head, and a cover body; the atomization guiding tube is arranged in the water tank, and the side wall of the atomization guiding tube is provided with an opening; the atomizing head is arranged in the atomization guiding tube; the cover body is arranged on the water tank and connected to the atomization guiding tube; an atomization outlet of the cover body is communicated with the atomization guiding tube. The invention has a simple structure; by arranging an atomization guiding tube and an atomizing head, the atomized water vapor does not need to roll from the bottom of the humidifier to the water surface, which achieves a good spray effect, and at the same time, eliminates the sound when the water vapor rolls.

9 Claims, 3 Drawing Sheets

HUMIDIFIER WITH AN ULTRASONIC SUSPENSION ATOMIZING HEAD

BACKGROUND OF THE INVENTION

1. Field of the Invention

The invention relates to a humidifier with an ultrasonic suspension atomizing head.

2. Description of the Related Art

Humidifier is a kind of household appliance that increases the humidity in the room. However, the atomizing head of the existing humidifier is fixed at the bottom of the humidifier, and it cannot float according to the height of the water level, so that the atomized water vapor needs to roll from the bottom of the humidifier to the water surface, which results in a small atomized water column, poor spraying effect, and loud sound when the water vapor rolls.

SUMMARY OF THE INVENTION

In order to solve the above problems, the invention provides a humidifier with an ultrasonic suspension atomizing head, comprising a water tank, an atomization guiding tube, an atomizing head, and a cover body; the atomization guiding tube is arranged in the water tank, and the side wall of the atomization guiding tube is provided with an opening; the atomizing head is arranged in the atomization guiding tube; the cover body is arranged on the water tank and connected to the atomization guiding tube; an atomization outlet of the cover body is communicated with the atomization guiding tube.

In one or more embodiments, the cover body comprises a body lower shell, a body upper shell, and an atomization outlet cover; the body lower shell is covered on the water tank; the body upper shell is arranged on the body lower shell; the atomization outlet cover is arranged on the body upper shell; the atomization outlet is located on the atomization outlet cover.

In one or more embodiments, a water filter cotton is provided between the atomization guiding tube and the atomization outlet.

In one or more embodiments, the atomizing head comprises a suspended lower shell, a suspended upper shell, a suspended cotton, and an atomizer; the suspended upper shell is arrange on the suspended lower shell; the suspended cotton is arranged in the installation space formed by the suspended lower shell and the suspended upper shell; the atomizer is arranged in the installation space and located between the suspended cotton and the suspended lower shell.

In one or more embodiments, the cover body is provided with a blower; the air inlet of the blower faces the air inlet of the cover body, and the air outlet thereof faces the air channel of the side wall of the atomization guiding tube.

In one or more embodiments, the side wall of the atomization guiding tube is provided with a fixing lock; the cover body is provided with a locking groove; the fixing lock is clamped in the locking groove.

In one or more embodiments, the fixing lock comprises an installation concave plate, a locking block, and a spring; the installation concave plate is arrange in the atomization guiding tube; the locking block is arranged in the installation position of the installation concave plate, and one end thereof is exposed at the installation position; the spring is arranged in the installation position, and two ends thereof abut against the atomization guiding tube and the locking block respectively.

In one or more embodiments, the cover body is provided with a control display assembly; the control display assembly comprises a control board and a display screen; the control board is arranged on an installation frame inside the cover body; the display screen is embedded in the cover body and is electrically connected to the control board.

In one or more embodiments, the cover body is provided with a temperature and humidity sensor board.

In one or more embodiments, the cover body is provided with a decorative ring.

The advantageous effects of the invention: the humidifier with an ultrasonic suspension atomizing head of the invention has a simple structure; by arranging an atomization guiding tube in the water tank and an atomizing head that can float up and down with the height of the water level in the atomization guiding tube, the atomized water vapor does not need to roll from the bottom of the humidifier to the water surface, which achieves a good spray effect, and at the same time, eliminates the sound when the water vapor rolls.

DETAILED DESCRIPTION OF THE PREFERRED EMBODIMENTS

Figure 1:
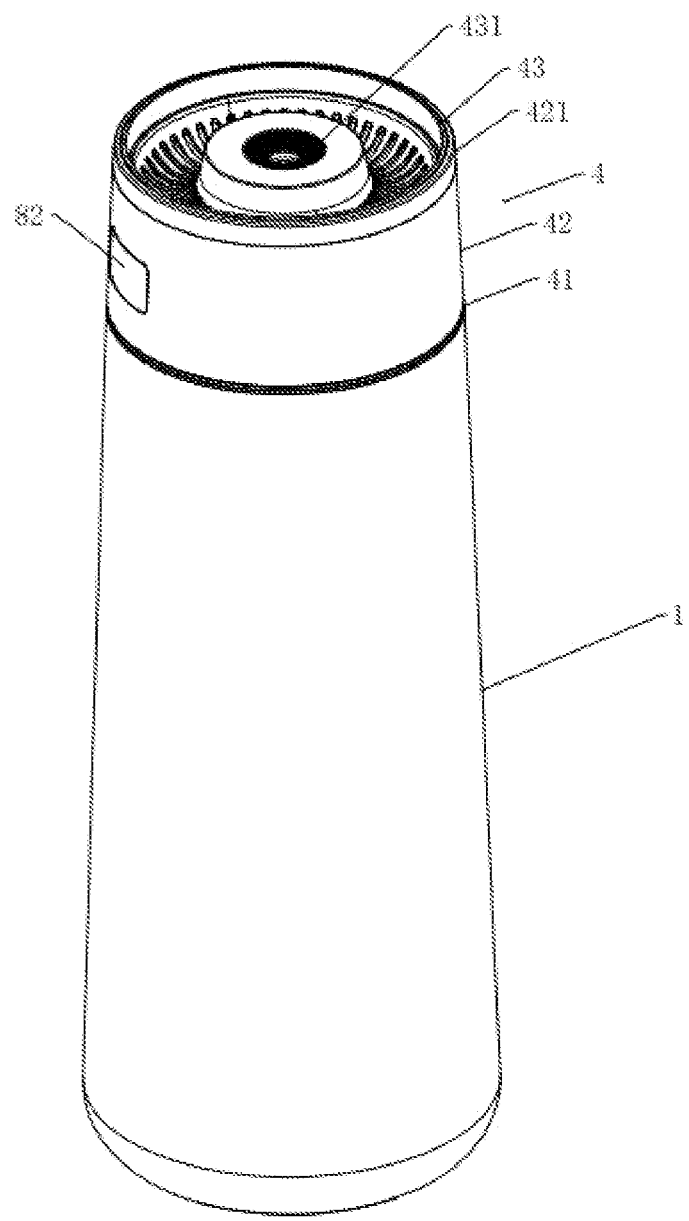
FIG. 1 is a structural view of the structure of the humidifier with an ultrasonic suspension atomizing head in an embodiment of the invention.
Figure 2:
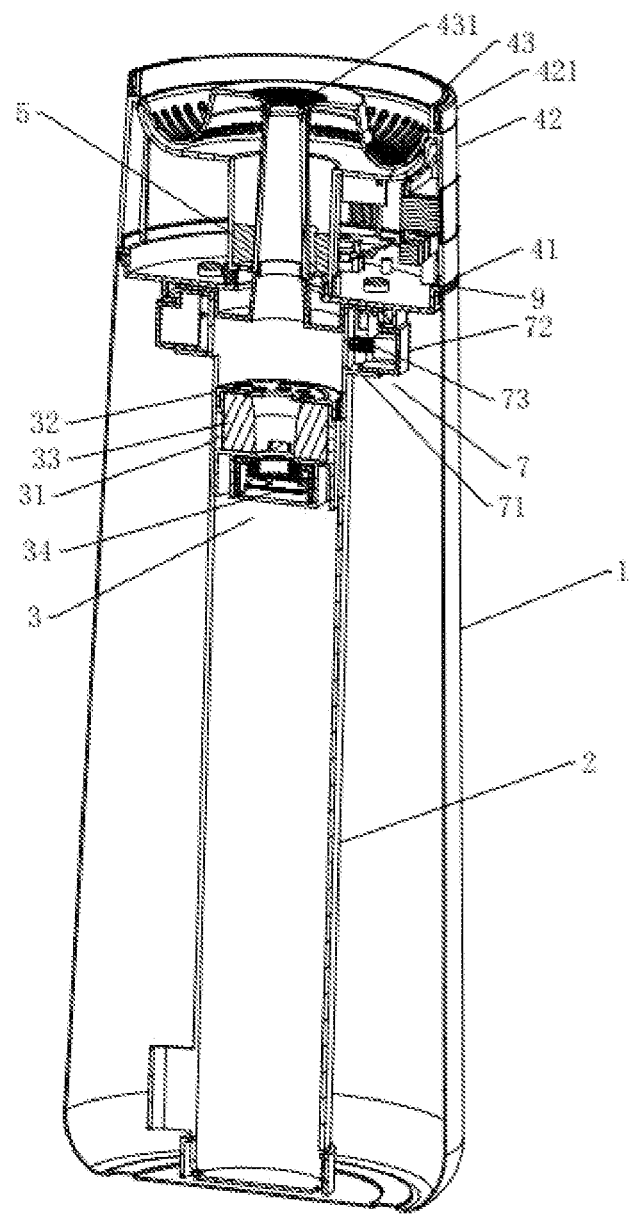
FIG. 2 is a cross-sectional view of the structure of the humidifier with an ultrasonic suspension atomizing head in an embodiment of the invention.
Figure 3:
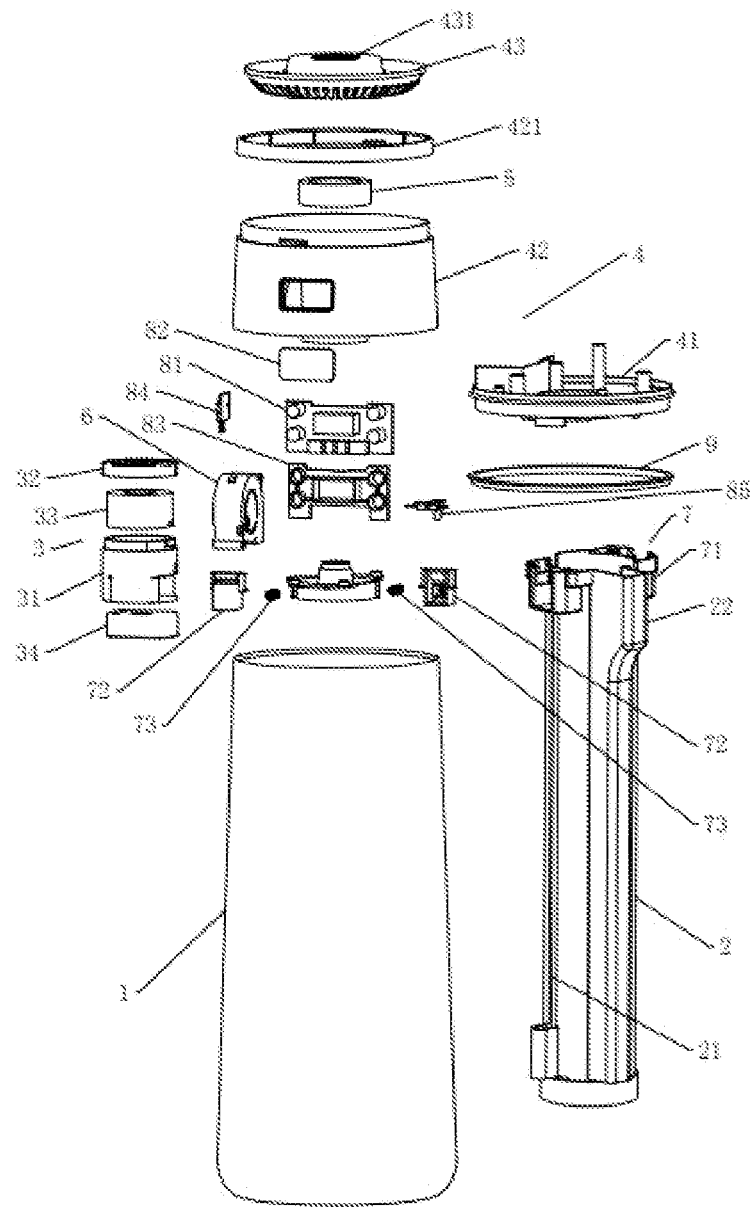
FIG. 3 is an exploded view of the structure of the humidifier with an ultrasonic suspension atomizing head in an embodiment of the invention.

The solution of the invention is further described hereinafter with reference to the drawings:

With reference to FIGS. 1-3, the humidifier with an ultrasonic suspension atomizing head of the invention comprises a water tank 1, an atomization guiding tube 2, an atomizing head 3, and a cover body 4; the atomization guiding tube 2 is arranged in the water tank 1, and the side wall of the atomization guiding tube 2 is provided with an opening 21; the atomizing head 3 is arranged in the atomization guiding tube 2; the cover body 4 is arranged on the water tank 1 and connected to the atomization guiding tube 2; an atomization outlet 431 of the cover body 4 is communicated with the atomization guiding tube 2.

Further, the cover body 4 comprises a body lower shell 41, a body upper shell 42, and an atomization outlet cover 43; the body lower shell 41 is covered on the water tank 1; the body upper shell 42 is arranged on the body lower shell 41; the atomization outlet cover 43 is arranged on the body upper shell 42; the atomization outlet 431 is located on the atomization outlet cover 43.

Further, the atomizing head 3 comprises a suspended lower shell 31, a suspended upper shell 32, a suspended cotton 33, and an atomizer 34; the suspended upper shell 32 is arrange on the suspended lower shell 31; the suspended cotton 33 is arranged in the installation space formed by the suspended lower shell 31 and the suspended upper shell 32; the atomizer 34 is arranged in the installation space and located between the suspended cotton 33 and the suspended lower shell 31.

In specific implementation, a predetermined amount of water is filled into the water tank 1; the water in the water tank 1 enters the atomization guiding tube 2 through the opening 21, and the atomizing head 3 is attached to the surface of the water under the action of the suspended cotton 33; the humidifier is started, and the atomizer 34 atomizes the water entering the installation space; the atomized water column is discharged upward from the suspended upper shell 32, and then discharged through the atomization guiding tube 2, the atomization outlet channel of the body lower shell 41, and the atomization outlet 431 of the atomization outlet cover 43 in sequence.

Preferably, a water filter cotton 5 is provided between the atomization guiding tube 2 and the atomization outlet 431. The water filter cotton 5 isolates impurities present in the water.

Preferably, the body upper shell 42 is provided with a blower 6; the air inlet of the blower 6 faces the air inlet of the body upper shell 42, and the air outlet thereof faces the air channel 22 of the side wall of the atomization guiding tube 2. The blower 6 can accelerate the spraying speed of the water atomization to quickly humidify the environment to a predetermined humidity.

Preferably, the side wall of the atomization guiding tube 2 is provided with a fixing lock 7; the body lower shell 41 is provided with a locking groove 411; the fixing lock 7 is clamped in the locking groove 411. Specifically, the fixing lock 7 comprises an installation concave plate 71, a locking block 72, and a spring 73; the installation concave plate 71 is arrange in the atomization guiding tube 2; the locking block 72 is arranged in the installation position of the installation concave plate 71, and one end thereof is exposed at the installation position; the spring 73 is arranged in the installation position, and two ends thereof abut against the atomization guiding tube 2 and the locking block 72 respectively. In specific implementation, the number of the fixing lock 7 is two, which are respectively located on opposite sides of the atomization guiding tube 2; correspondingly, the number of the locking groove 411 is also two. When installing, pinch the two locking blocks 72 so that the two locking catches are close; at this time, the spring 73 is compressed; align the locking block 72 with the locking groove 411, and release the locking block 72, so that the spring 73 returns to the uncompressed state; the spring 73 pushes the locking block 72 to be locked in the locking groove 411.

Preferably, the cover body 4 is provided with a control display assembly 8; the control display assembly 8 comprises a control board 81 and a display screen 82; the control board 81 is arranged on an installation frame 83 inside the body upper shell 42; the display screen 82 is embedded in the cover body 4 and is electrically connected to the control board 81. The control board 81 facilitates control of the humidifier. The display screen 82 can display the working status of the humidifier, which is convenient for the user to understand.

Preferably, the body upper shell 42 is provided with a temperature and humidity sensor board 84. The temperature and humidity sensor board 84 is electrically connected to the control board 81. The temperature and humidity sensor board 84 monitors the temperature and humidity, and automatically adjusts the working state of the humidifier.

Preferably, the body upper shell 42 of the cover body 4 is sleeved with a decorative ring 421; the inside of the body upper shell 42 is provided with an atmosphere lamp 85; the atmosphere lamp 85 is electrically connected to the control board 81. The light of the atmosphere lamp 85 can be seen through the decorative ring 421, which can function as a night light at night.

Preferably, a sealing ring 9 is provided at the connection between the body lower shell 41 and the water tank 1 to realize the sealing of the connection.

The above preferred embodiments should be regarded as embodiments of the implementation of the invention, and all technical deductions, substitutions, improvements, etc. that are identical to, similar to, or based on the invention should be regarded as the protection scope of the invention.

What is claimed is:

1. A humidifier with an ultrasonic suspension atomizing head, comprising a water tank, an atomization guiding tube, an atomizing head, and a cover body; the atomization guiding tube is arranged in the water tank, and the side wall of the atomization guiding tube is provided with an opening; the atomizing head is arranged in the atomization guiding tube; the cover body is arranged on the water tank and connected to the atomization guiding tube; an atomization outlet of the cover body is communicated with the atomization guiding tube;

wherein the atomizing head comprises a suspended lower shell, a suspended upper shell, a suspended cotton, and an atomizer; the suspended upper shell is arrange on the suspended lower shell; the suspended cotton is arranged in the installation space formed by the suspended lower shell and the suspended upper shell; the atomizer is arranged in the installation space and located between the suspended cotton and the suspended lower shell.

2. The humidifier with an ultrasonic suspension atomizing head according to claim 1, wherein the cover body comprises a body lower shell, a body upper shell, and an atomization outlet cover; the body lower shell is covered on the water tank; the body upper shell is arranged on the body lower shell; the atomization outlet cover is arranged on the body upper shell; the atomization outlet is located on the atomization outlet cover.

3. The humidifier with an ultrasonic suspension atomizing head according to claim 1, wherein a water filter cotton is provided between the atomization guiding tube and the atomization outlet.

4. The humidifier with an ultrasonic suspension atomizing head according to claim 1, wherein the cover body is provided with a blower; the air inlet of the blower faces the air inlet of the cover body, and the air outlet thereof faces an air channel of the side wall of the atomization guiding tube.

5. The humidifier with an ultrasonic suspension atomizing head according to claim 1, wherein the side wall of the atomization guiding tube is provided with a fixing lock;
the cover body is provided with a locking groove; the fixing lock is clamped in the locking groove.

6. The humidifier with an ultrasonic suspension atomizing head according to claim 5, wherein the fixing lock comprises an installation concave plate, a locking block, and a spring; the installation concave plate is arrange in the atomization guiding tube; the locking block is arranged in the installation position of the installation concave plate, and one end thereof is exposed at the installation position; the spring is arranged in the installation position, and two ends thereof abut against the atomization guiding tube and the locking block respectively.

7. The humidifier with an ultrasonic suspension atomizing head according to claim 1, wherein the cover body is provided with a control display assembly; the control display assembly comprises a control board and a display screen; the control board is arranged on an installation frame inside the cover body; the display screen is embedded in the cover body and is electrically connected to the control board.

8. The humidifier with an ultrasonic suspension atomizing head according to claim 1, wherein the cover body is provided with a temperature and humidity sensor board.

9. The humidifier with an ultrasonic suspension atomizing head according to claim 1, wherein the cover body is provided with a decorative ring.

\* \* \* \* \*